Nov. 1, 1955 R. E. DIETERICH 2,722,460

FASTENING DEVICE FOR SPOKE SIMULATING SHROUDS

Filed March 3, 1953 2 Sheets-Sheet 1

Inventor
Richard E. Dieterich
By J. Irving Silverman
Attorney

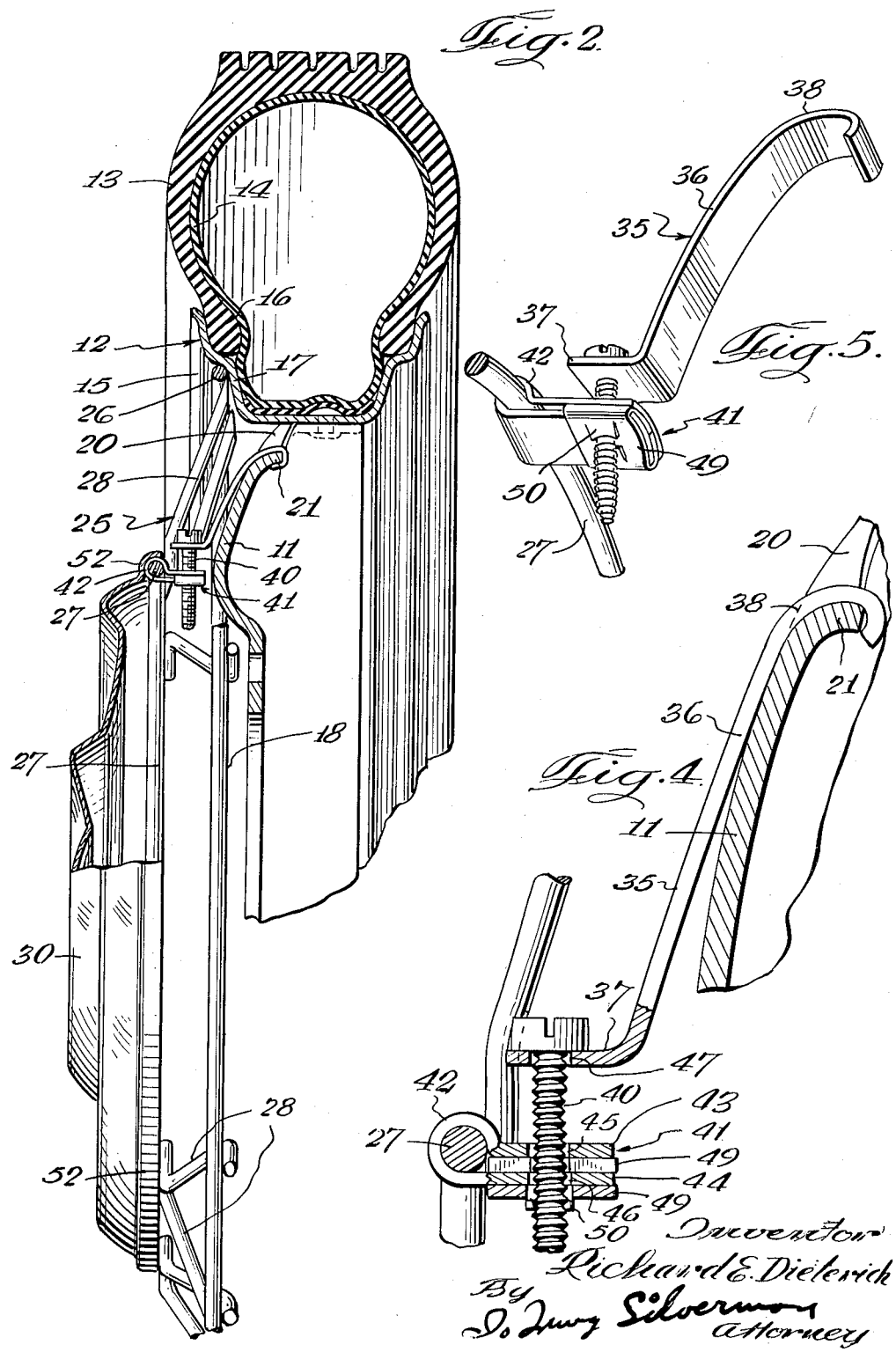

United States Patent Office 2,722,460
Patented Nov. 1, 1955

2,722,460

FASTENING DEVICE FOR SPOKE SIMULATING SHROUDS

Richard E. Dieterich, Long Beach, Ind., assignor to Van Auken, Inc., Detroit, Mich., a corporation of Michigan Application March 3, 1953, Serial No. 339,965

7 Claims. (Cl. 301—37)

This invention relates generally to fastening devices and more particularly is concerned with devices which are intended to secure spoke simulating shrouds to metal automobile wheels.

In my co-pending application, Serial No. 332,187, filed January 21, 1953, and entitled Spoke Simulating Shroud for Automobile Wheels, I have described an ornamental shroud which is intended to be secured to an automobile wheel in order to give the wheel the appearance of the so-called "sport" styling that is popular at the present time. Such shrouds are formed of a plurality of rings concentrically arranged and having short spokes fastened between the rings about the periphery of the assembled shroud. The shroud fits into the automobile wheel on the outside surface thereof and may either circle the hub-cap or be provided with an ornamental hub cap or "knock-off" cap which replaces the hub cap. The shroud is intended to be associated with the conventional type of metal disc wheels so that no modification of the automobile is necessary to attach the shrouds.

The type of automobile wheel referred to is provided with slots about the periphery thereof, just inside the tire supporting flanges and the fastening devices of the invention engage inside these slots and clamp to a ring of the shroud and retains the shroud against the wheel in a firm and rattle-proof association.

Accordingly, the objects of the invention are generally as follows: to provide a fastening device which is designed to secure a spoke-simulating shroud to a disc wheel; to provide such a fastening device which is simple to produce and install, and which is, nevertheless, strong and effective to hold the spoke simulating shroud to the wheel; and to provide a fastening device by means of which the shroud can be readily removed or installed without disassembly of the devices from the shroud.

Many other objects will become apparent as the description of the invention proceeds, in connection with which there has been illustrated and described in considerable detail a preferred embodiment of the invention.

In the drawings:

Fig. 2 is a sectional view through the installation taken generally along the line 2—2 of Fig. 1 and in the indicated direction.

Fig. 4 is an enlarged fragmentary sectional view taken generally along the line 4—4 of Fig. 1 and in the indicated direction.

Fig. 5 is a perspective view of the fastening device.

Referring now generally to the drawings, it is desired to point out that the invention lies not only in the fastening device itself, but also in the combination of the fastening device with the shroud and in the manner of securing the hub cap to the shroud such that it will not interfere with the fastening devices.

Figure 1:
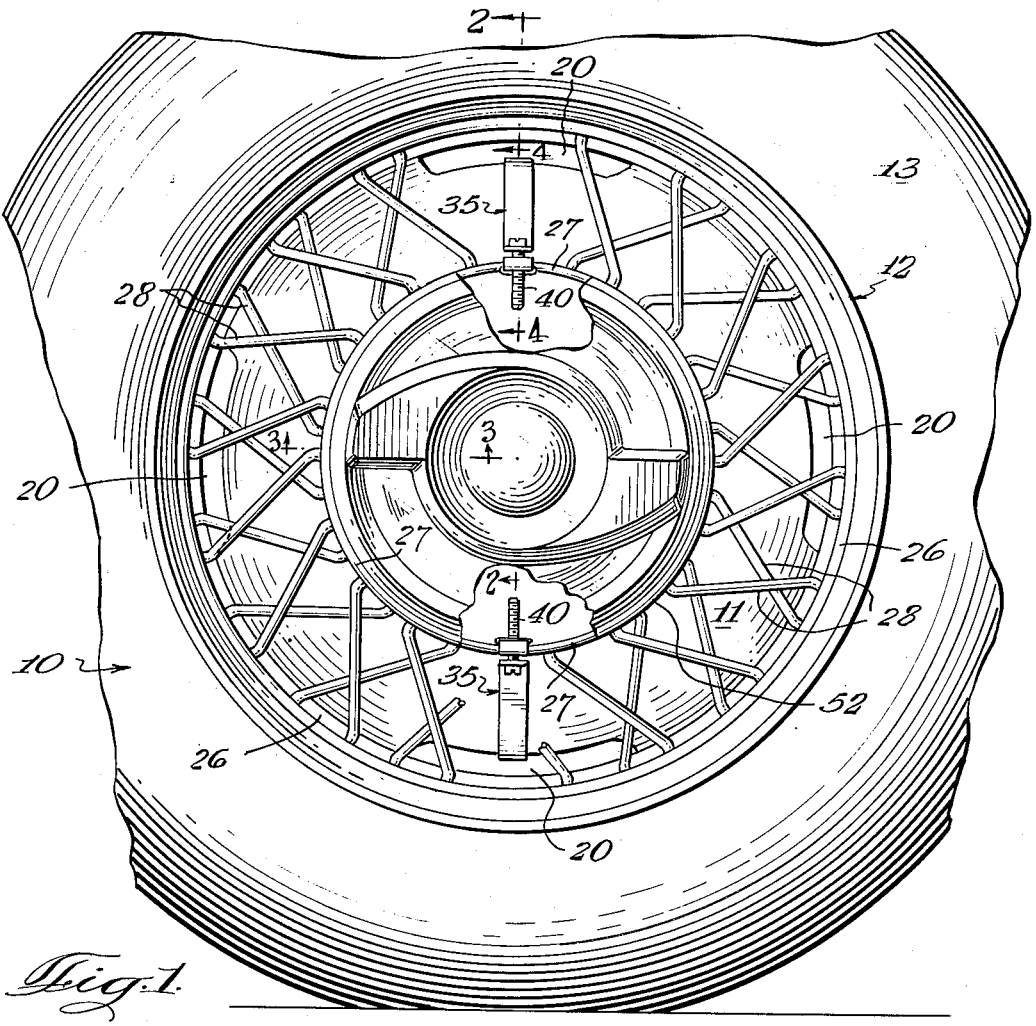
Fig. 1 is a fragmentary side elevational view of a wheel having a spoke-simulating shroud secured thereto by means of my new devices, portions being broken away to show details.
Figure 3:
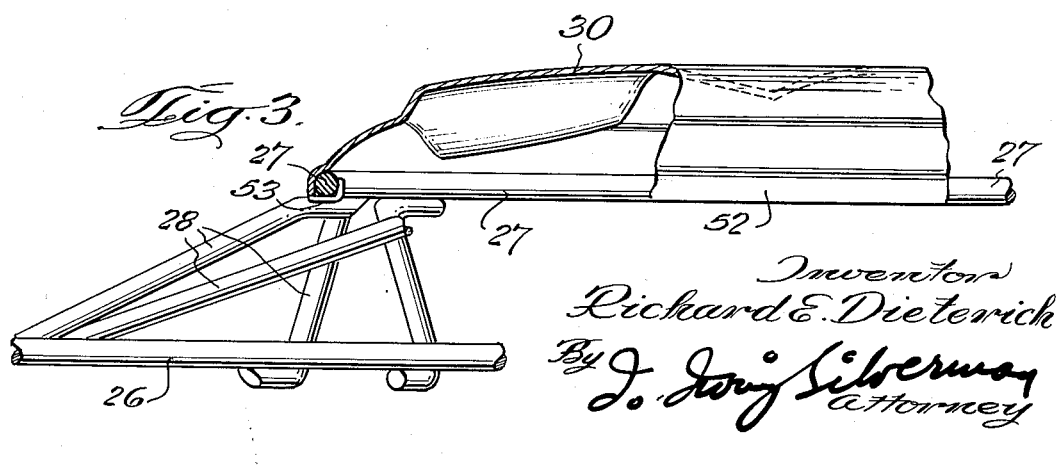
Fig. 3 is a sectional view taken generally through the spoke-simulating shroud along the line 3—3 of Fig. 1 and in the indicated direction and showing the manner in which the hub cap is secured thereto.

In Fig. 1, I have shown a wheel designated generally 10 having a disc portion 11 provided with an outwardly opening channel shaped portion 12 for receiving thereon the tire 13 and tube 14. This is best shown in cross section in Fig. 2. It will be noted that the portion 12 includes an outwardly flared flange 15 which receives the tire bead 16, as well as a body portion of lesser flare as shown at 17 and into which the tube inflates. The disc 11 has a rather small annular portion as may be judged from study of Fig. 2, which is conventional with modern automobiles. Of course, this same disc portion on the wheels of automobiles some decades ago was quite substantial. Modern wheels use larger tires and larger hub caps. Note the central dished portion 18 normally closed off by a hub cap (not shown).

It is customary to provide the discs of modern automobiles with slots, such as those shown at 20, about the periphery of the disc 11. These slots are somewhat in the nature of strengthening ridges, since they are upset into the disc with markedly rounded edges, giving ride to curled, inwardly extending flanges, such as shown at 21 in Figs. 2 and 4.

As thus far described, the wheel 10 is conventional, and the specific type is that with which the invention is intended to be associated. I provide a shroud 25 which is to be secured to the outside of the wheel engaged against the disc 11 to simulate the appearance of wire spokes. This shroud includes at least two wire rings, 26 and 27, the latter being concentric of the former and axially spaced therefrom. The ring 26 nests in the circular groove formed by the juncture between the flared flange 15 and the flared portion 17. The ring 27 frames the dished portion 18 and is connected with the ring 26 through the medium of a plurality of ornamentally arranged spokes 28 of any suitable formation and construction. In the case that the hub cap of the wheel is to be used, i. e., the wheel is to carry the cap with which it is normally furnished by the manufacturer, the dished portion is covered and the cap is framed by the ring 27. I prefer however that the ordinary hub cap be dispensed with, and a hub cap 30 be carried by the shroud 25. The manner of fastening this hub cap 30 shortly will be explained, but it is to be emphasized that the fastening device of the invention, now to be described specifically may be adapted for use in either case.

Referring now to Figs. 4 and 5, principally, the fastening device is designated generally 35 and same includes an elongate strip of metal formed in the general shape of an L, with a body portion 36 and a leg 37. The leg is intended to be arranged parallel to the axis of the wheel, and from that position, the body portion 36 extends radially outwardly and slants at an angle to the leg 37. At its upper end, the strip of metal is curled to form a hook 38, the configuration of which is such that the said hook will hug the curled flange or lip 21 of the opening 20 and engage on the inside thereof.

The leg 37 is connected by means of a simple headed screw 40 to a clamp 41 which is engaged to the ring 27. The clamp 41 consists of a metal strap looped over the ring 27 as shown at 42 and providing facing arms 43 and 44 extending to the rear of the shroud 25 (considering that the outwardly facing portion of the wheel 10 to which the shroud is secured is the front). The arms are pierced at 45 and 46 to accommodate the screw 40, and the leg 37 also has a hole 47 through which the screw 40 extends. A punch nut 49 with downwardly extending prongs 50 of the conventional type is folded about the lower arm 44 with the openings thereof aligned with openings 45 and 46. Screwing up on the screw 40 will obviously pull the ring 27 and hence the shroud 25 inwardly causing the ring 26 to nest tightly against the channel portion 12. To remove or install the shroud, the screw 40 is loosened sufficient to permit the hook 38 to enter or be removed from the slot 20.

It will be seen that I have used two of these fastening devices 35, diametrically opposite one another in order to fasten the shroud 25, and if desired more than two such devices may be used.

The device 35 is so constructed that the only outwardly extending parts are the thin gauge loops 42 about the rings 27. This enables a false hub cap 30 to be engaged against the ring 27 through the offices of a curled flange 52 which closely fits upon and hides the ring 27 and readily engages over the loops 42 without interference. Tabs 53 integrally formed with the false hub cap 30 about the flange 52 are readily deformable about the inside of the ring 27 to secure the hub cap 30 to the shroud 25. This assembly in no way prevents ready access to the fastening devices 35.

It is believed the invention should readily be understood and be appreciated without further explanation and it is manifest that considerable variations in the minor details as to size and configuration are possible without departing from the scope of the invention as measured by the appended claims.

I claim:

1. In combination with an automobile wheel of the disc type and having peripheraly arranged slots about the disc, a spoke simulating shroud engaged against the wheel disc and including a hub cap encircling ring, a fastening device for securing the shroud to the wheel comprising an L-shaped strip of metal with the short leg arranged parallel to the axis of the wheel and the long leg having a curled hook on its end, a clamping strap looped about the said ring and extending inwardly of the shroud, a nut on the strap, a screw connected between the short leg and the strap for drawing the same together, and the curled hook being engaged in one of said slots.

2. In combination with an automobile wheel of the disc type and having peripherally arranged slots about the disc, a spoke simulating shroud engaged against the wheel disc and including a hub cap encircling ring, a fastening device for securing the shroud to the wheel comprising an L-shaped strip of metal with the short leg arranged parallel to the axis of the wheel and the long leg having a curled hook on its end, a clamping strap looped about the said ring and extending inwardly of the shroud, a nut on the strap, a screw connected between the short leg and the strap for drawing the same together, and the curled hook being engaged in one of said slots, said strap having a pair of spaced arms and a loop connecting a respective end of each arm one to the other adapted to receive said ring therein, one of said arms having said nut thereon.

3. In combination with an automobile wheel of the disc type and having peripherally arranged slots about the disc, a spoke simulating shroud engaged against the wheel disc and including a hub cap encircling ring, a fastening device for securing the shroud to the wheel comprising an L-shaped strip of metal with the short leg arranged parallel to the axis of the wheel and the long leg having a curled hook on its end, a clamping strap looped about the said ring and extending inwardly of the shroud, a nut on the strap, a screw connected between the short leg and the strap for drawing the same together, and the curled hook being engaged in one of said slots, said long leg being angularly disposed relative to the short leg whereby to be substantially juxtaposed with said disc.

4. A fastening device for securing a spoke simulating shroud to an automobile wheel of the disc type having peripherally arranged slots, said shroud having a hub cap encircling ring and adapted to be secured against said disc, said device having a pair of cooperating members of which one member comprises a single strip of metal having means on one end thereof adapted to be engaged in one of said slots, and a straight portion adjacent its opposite end adapted to be arranged parallel to the axis of said wheel, and the other member comprises a clamping strap having one end thereof looped about said ring, and tightening means adapted to be connected between said straight portion and said strap for drawing same together.

5. A device of the character described in claim 4 in which said first mentioned means comprises a hook and said hook and straight portion are connected by a body portion extending radially outwardly and at an obtuse angle relative to said straight portion.

6. A device of the character described in claim 4 in which said strap comprises a pair of spaced arms and said tightening means comprises a nut on one arm and a screw connected between said arms and straight portion.

7. In an assembly which includes an automobile wheel having a spoke simulating shroud secured thereto, the shroud including at least an outer wire ring encircling the hub cap area, and fastening devices securing the shroud to the wheel and including looped metal straps secured to the ring, a hub cap member engaging over and covering the said ring and concealing the looped metal straps and having a plurality of circumferentially spaced tabs enwrapped about the said ring to secure the said hub cap member to the ring.

References Cited in the file of this patent

UNITED STATES PATENTS 2,614,001    Rycroft _____ Oct. 14, 1952

FOREIGN PATENTS 714,587    France _____ Sept. 7, 1931